United States Patent
Gao et al.

(10) Patent No.: US 9,189,506 B2
(45) Date of Patent: Nov. 17, 2015

(54) DATABASE INDEX MANAGEMENT

(75) Inventors: Ying Ming Gao, Beijing (CN); Jia Huo, Beijing (CN); Kai Zhang, Beijing (CN); Xian Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 13/371,577

(22) Filed: Feb. 13, 2012

(65) Prior Publication Data

US 2012/0221534 A1    Aug. 30, 2012

(30) Foreign Application Priority Data

Feb. 28, 2011    (CN) .......................... 2011 1 0051574

(51) Int. Cl.
*G06F 17/30*    (2006.01)

(52) U.S. Cl.
CPC ...... *G06F 17/30312* (2013.01); *G06F 17/3002* (2013.01); *G06F 17/30017* (2013.01); *G06F 17/30097* (2013.01); *G06F 17/30619* (2013.01); *G06F 17/30769* (2013.01)

(58) Field of Classification Search
CPC .............. G06F 17/30; G06F 17/30312; G06F 17/30097; G06F 17/30017; G06F 17/30619; G06F 17/30769; G06F 17/3002
USPC ................. 707/672–673, 736–747, 802–803, 707/828–830
See application file for complete search history.

(56) References Cited

U.S. PATENT DOCUMENTS

| | | | | |
|---|---|---|---|---|
| 5,758,356 A | * | 5/1998 | Hara et al. | 707/683 |
| 5,960,423 A | * | 9/1999 | Chaudhuri et al. | 707/715 |
| 6,073,134 A | * | 6/2000 | Shoup et al. | 1/1 |
| 6,542,893 B1 | * | 4/2003 | Quernemoen | 1/1 |
| 2003/0033328 A1 | * | 2/2003 | Cha et al. | 707/204 |
| 2003/0093408 A1 | * | 5/2003 | Brown et al. | 707/2 |
| 2004/0225865 A1 | * | 11/2004 | Cox et al. | 712/34 |
| 2006/0004840 A1 | * | 1/2006 | Senda | 707/102 |
| 2006/0080345 A1 | * | 4/2006 | Murthy et al. | 707/100 |
| 2006/0294058 A1 | | 12/2006 | Zabback et al. | |
| 2007/0239744 A1 | * | 10/2007 | Bruno et al. | 707/101 |

(Continued)

FOREIGN PATENT DOCUMENTS

| | | | |
|---|---|---|---|
| CN | 101246500 A | 8/2008 |
| JP | 11053401 A | 2/1999 |

(Continued)

OTHER PUBLICATIONS

Jaideep Srivastava et al. "Efficient Algorithms for Maintenance of Large Database", IEEE 1988, pp. 402-408.*

(Continued)

*Primary Examiner* — Srirama Channavajjala
(74) *Attorney, Agent, or Firm* — Cantor Colburn LLP

(57) ABSTRACT

Managing database indexes includes creating a main index and creating at least one service index that is configured for recording a change to a node to be updated in the main index. Managing database indexes also includes detecting whether an operation that involves the main index and is performed on the database appears in the database, and maintaining the main index using at least one service index in response to the operation that involves the main index and is performed on the database, appearing in the database. The maintaining is performed based on changes to a node to be updated in the main index that are recorded in the at least one service node.

9 Claims, 7 Drawing Sheets

(56) References Cited

U.S. PATENT DOCUMENTS

| | | | |
|---|---|---|---|
| 2008/0294863 A1* | 11/2008 | Faerber et al. | 711/170 |
| 2009/0063662 A1* | 3/2009 | Baker et al. | 709/220 |
| 2009/0094236 A1* | 4/2009 | Renkes et al. | 707/6 |
| 2009/0193406 A1* | 7/2009 | Williams | 717/168 |
| 2009/0210429 A1 | 8/2009 | Agrawal et al. | |
| 2010/0235348 A1 | 9/2010 | Baby et al. | |
| 2010/0262617 A1* | 10/2010 | Shinjo et al. | 707/769 |
| 2010/0281005 A1 | 11/2010 | Carlin et al. | |
| 2010/0281013 A1* | 11/2010 | Graefe | 707/715 |

FOREIGN PATENT DOCUMENTS

| | | | |
|---|---|---|---|
| WO | WO 9933002 | * | 7/1999 |
| WO | 03003255 A3 | | 1/2003 |

OTHER PUBLICATIONS

C. Böhm, et al., "Searching in High-Dimensional Spaces—Index Structures for Improving the Performance of Multimedia Database", pp. 1-74, [Retrieved Dec. 16, 2009, http://infolab.usc.edu/csci599/Fall2002/paper/IS1_ACMSurvey.pdf2.].

L. Daynes, et al., "Sharing the Runtime Representation of Classes Across Class Loaders", ECOOP—Object-Oriented Programming Lecture Notes in Computer Science, 2005, vol. 3586/2005, pp. 97-120, [Retrieved Dec. 16, 2009, http://www.springerlink.com/content/c0bfjd7njuyy3u2f/].

Chinese Office Action dated Mar. 25, 2014, International Application No. 201110051574.8, seven pages.

* cited by examiner

300

| Row ID 302 | Value 304 | Type of the operation performed on the main index 306 |

Fig. 3

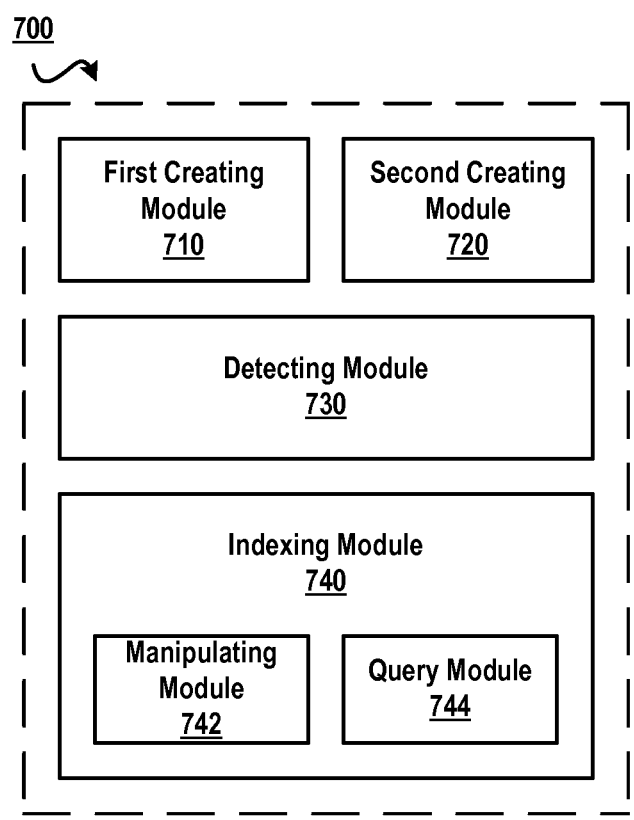

DATABASE INDEX MANAGEMENT

PRIORITY

The present application claims priority to Chinese Patent Application No. 201110051574.8, filed on 28 Feb. 2011, and all the benefits accruing therefrom under 35 U.S.C. §119, the contents of which in its entirety are herein incorporated by reference.

FIELD OF THE INVENTION

The present invention relates to database management, and more particularly to managing database indexes.

BACKGROUND

Developments in database technology have yielded increased capabilities with respect to data organization, data management, and data storage for various computer applications. In recent years, database storage capacity has gradually increased, and various operations performed by users on a database have also become more and more complex and frequent. Thus, ensuring that the database quickly returns a result desired by a user within an expected response time has become a hot study topic in the database field.

In existing database management systems (DBMSs), database indexing technology has been widely applied. A database index is a structure that sorts values in one or more columns of a database table. With an index, particular information in the database table may be quickly accessed. A database index may greatly accelerate the response speed of a query operation. However, it may also cause some negative impacts despite the above-mentioned improvements in query performance.

Further, when performing a data manipulation operation (i.e., data manipulation language (DML) operations, such as insert, delete, and modify) on the database table, it might be necessary to update the index. In this event, the database management system has to modify the data in various tables of the database, as well as update the index impacted by the DML operation. In other words, this DML operation can be deemed as complete only after both the table in the database and the impacted index have been successfully updated. If only the table in the database has been successfully updated while the impacted index has not been updated yet, the index cannot accurately reflect the actual state of the database. Thus, if a query is performed on an index that has not been completely updated, the returned result might be inconsistent with the latest data stored in the database. For a large database, its index may have a quite complex data structure; thus, the time spent on updating the index may have an adverse impact on the response time of the database.

SUMMARY

In one embodiment, there is provided a method of managing database indexes. The method includes creating a main index, and creating at least one service index configured for recording changes to a node to be updated in the main index. The method also includes detecting whether an operation that involves the main index and is performed on the database appears in the database. The method further includes maintaining the main index by using the at least one service index, in response to the operation that involves the main index and is performed on the database appearing the database. The maintaining is performed based on changes to a node to be updated in the main index that are record in the at least one service index.

In another embodiment, there is provided an apparatus for managing database indexes. The apparatus includes a first creating module configured to create a main index, and a second creating module configured to create at least one service index. The at least one service index is configured for recording changes to a node to be updated in the main index. The apparatus also includes a detecting module configured to detect whether an operation that involves the main index and is performed on the database appears in the database. The apparatus further includes an indexing module configured to maintain the main index by using the at least one service index, in response to the operation that involves the main index and is performed on the database appearing in the database. The maintaining is performed based on changes to a node to be updated in the main index that are recorded in the at least one service index.

In a further embodiment, a computer program product for managing database indexes is provided. The computer program product includes a computer readable storage medium having computer readable program code embodied therewith. When the computer readable program code is executed by a computer, the computer is configured to implement a method. The method includes creating a main index, and creating at least one service index configured for recording changes to a node to be updated in the main index. The method also includes detecting whether an operation that involves the main index and is performed on the database appears in the database. The method further includes maintaining the main index by using the at least one service index, in response to the operation that involves the main index and is performed on the database appearing the database. The maintaining is performed based on changes to a node to be updated in the main index that are record in the at least one service index.

BRIEF DESCRIPTION OF THE SEVERAL VIEWS OF THE DRAWINGS

Features, advantages, and other aspects of various embodiments of the present invention will become more apparent through the following detailed description with reference to the following drawings, wherein:

FIG. 3 illustrates a diagram of a data structure of a node in a service index according to one embodiment of the present invention;

FIG. 7 illustrates a block diagram of an apparatus for managing database indexes by using a service index according to one embodiment of the present invention.

DETAILED DESCRIPTION

Figure 1:
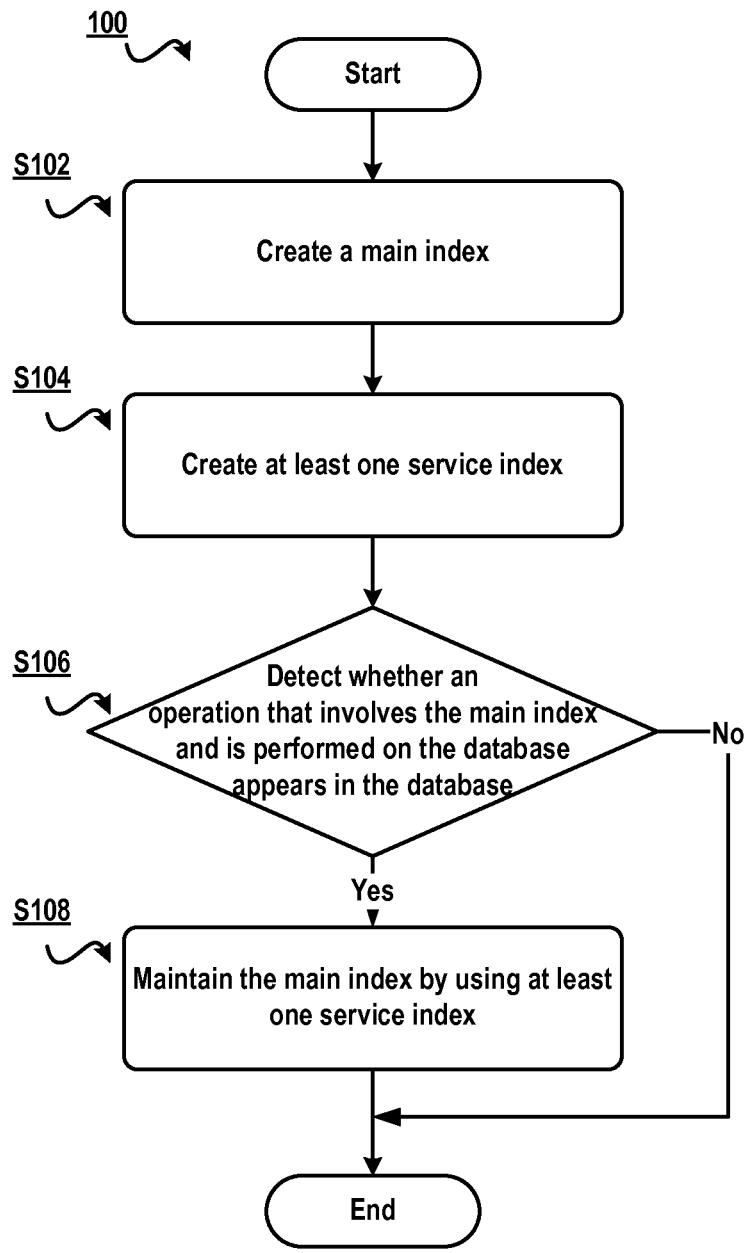
FIG. 1 illustrates a flowchart of a method of managing database indexes by using a service index according to one embodiment of the present invention.

Hereinafter, various embodiments will be described in detail with reference to the drawings.

The flowcharts and block diagrams in the figures illustrate the system, methods, as well as architecture, functions and operations executable by a computer program product according to the embodiments. In this regard, each block in the flowcharts or block diagrams may represent a module, a program segment, or a part of code, which contains one or more executable instructions for performing specified logic functions. It will be understood that, in some alternative implementations, the functions noted in the blocks may also occur in a sequence different from what is noted in the drawings. For example, two blocks shown consecutively may be performed in parallel substantially or in an inverse order. This depends on relevant functions. It should also be noted that each block in the block diagrams and/or flowcharts and a combination of blocks in the block diagrams and/or flowcharts may be implemented by a dedicated hardware-based system for performing specified functions or operations or by a combination of dedicated hardware and computer instructions.

In one embodiment, access speed to a database may be improved by using a main index and at least one service index based on a fast response policy. In one embodiment, in response to an operation that involves a main index and is performed on a database, the main index is maintained by using at least one service index.

Hereinafter, definitions of some terms in various embodiments are first explained briefly.

Fast response policy: the fast response policy refers to a policy of quickly updating nodes in a main index and at least one service. The principle is that once any one of the at least service index and the main index has been successfully updated, it is deemed that a DML operation on the database is complete. Therefore, employing the fast response policy may improve the efficiency of data operation.

Main index: the main index in various embodiments corresponds to a conventional index, and is referred to herein as a main index in order to distinguish it from a service index.

Service index: the service index is an index for recording changes to a node to be updated in the main index. It differs from the data structure of a main index in that a node of the service index includes an operation type (e.g., inserting or deleting) for the main index. The service index serves the main index, and its node data are data with respect to the change process of the main index node. In the whole index structure (i.e., the main index and at least one service index), the parameter and type of a service index may be defined independent of the main index, so as to accelerate updating and maintaining the index structure. Therefore, the performance of various data operations on the database is improved.

It will be understood that in different embodiments, one or more service indexes may be set based on different demands. In one embodiment, the changes that are recorded by the nodes in all service indexes (which may include one or more service indexes) will be updated into the main index. Although at times the main index cannot individually reflect the index state corresponding to an updated table in the database, the at least one service index and the main index may operate as a whole to reflect the latest index information corresponding to the table of the updated database. Because the data manipulation operation is deemed as being complete when any one of the at least one service index and main index has been successfully updated, the speed of updating the database index may be greatly accelerated.

The basic principles and application environment of various embodiments have been briefly described above, and hereinafter, some embodiments will be described in detail with reference to FIGS. 1 to 7. FIG. 1 illustrates a flowchart 100 of a method of managing database indexes by using a service index according to one embodiment. As illustrated at block S102, a main index is created. At block S104, at least one service index is created. It will be understood that the main index here corresponds to a conventional index. If a conventional index already exists in the database, at least one service index may be created according to embodiments, and the existing conventional index is adjusted to be adapted to the embodiments; otherwise, a main index and at least one service index may be created based on the embodiments.

In one embodiment, the at least one service index is used for recording changes to a node to be updated in the main index. It will be understood that the service index in various embodiments is not equivalent to a conventional index. What is saved in the conventional index is a structure for sorting values of one or more columns in a database table, and the structure enables particular information in the database table to be quickly accessed by using the conventional index. By contrast, the at least one service index in various embodiments records the change to a node to be updated in the main index, such that the most current data in the database may be obtained through calculating the main index and at least one service index in the event the main index has not yet been updated completely.

Performing the DML operations may result in a need to update the database index. If the index size of the database is relatively small, then very little time is needed to update the index. In other words, the efficiency of updating a small index is generally higher than that of updating a large index. In some embodiments, at least one service index that is smaller in size than the main index (which corresponds to a conventional index) is created to accelerate the speed of index updating, thereby further reducing the response time of data operation on the database. However, the efficiency of updating a small index is not always higher than that of updating a larger index. In some particular circumstances, it is possible that the larger index has been completely updated first. Therefore, in one embodiment, the main index and at least one service index may be updated in parallel so as to achieve an optimal efficiency.

At block S106, it is detected whether an operation that involves the main index and is performed on the database appears in the database. Because the embodiments provide for the management of the database index, in the event that the operation performed on the database does not involve the main index, such does not fall within the consideration scope of the embodiments of the present invention. Accordingly, the detecting block S106 is provided in the flow diagram.

At block S108, in response to the appearance of the operation in the database that involves the main index and is performed on the database, the main index is maintained by using the at least one service index. The maintaining is performed based on the changes to a node to be updated in the main index that are recorded in the at least one service index. The main index and the at least one service index appear as a whole to an external entity. The main index and the at least one service index operate in coordination based on a predetermined rule.

In one embodiment, the operation that is performed on the database may include performing one or both of a data manipulation operation and a data query operation on the database. It will be understood that the operation involving the main index may occur under the following circumstances:

(1) when performing a DML operation on a table in the database, the operations of insertion, deletion, and modification to various tables may result in the need of updating the main index (however, not all DML operations result in updating the index); and (2) when querying the database, a query is generally performed with respect to the main index so as to accelerate the response speed; thus, a data query operation may also relate to the main index.

It will be understood that in one embodiment, maintaining a main index by using at least one service index is performed synchronously with other operations on the database. In other words, this maintaining operation does not exclude performing the data manipulation operation and data query operation on the database. Further, the embodiments provide for the data manipulation operation and data query operation. In this event, the two indexes as a whole are synchronously associated with the data in the database.

In one embodiment, when performing the data manipulation operation and/or data query operation on the database, the main index and at least one service index, as a whole, provide the ability to quickly update the database index. By synchronously maintaining the main index while performing other operations on the database, the main index and at least one service index are enabled to reflect the data in the database in real time; and on the other hand, in contrast with an asynchronous manner of first updating the data in the database and after a while further maintaining the database index, the synchronization manner of the embodiments requires no extra time to maintain the index and thus does not affect other operations that are performed on the database.

The method according to the embodiments is compatible with a conventional database and thus may be implemented with minimal modification to the existing database management system configuration. In existing DBMSs, the following examples of Data Definition Language (DDL) statements with respect to index maintaining are provided:

```
CREATE INDEX idx_name ON TABLE tb_name(column1,...) ...;
ALTER INDEX idx_name ...;
```

In one embodiment, the keywords enable_fast_response and disable_fast_response may be added. Hereinafter, an example according to one embodiment will be illustrated.

(1) Create an index in a fast response mode:

```
CREATE INDEX idx_name on TABLE tb_name(column1,...) ...
enable_fast_response with n...;
```

Figure 2:
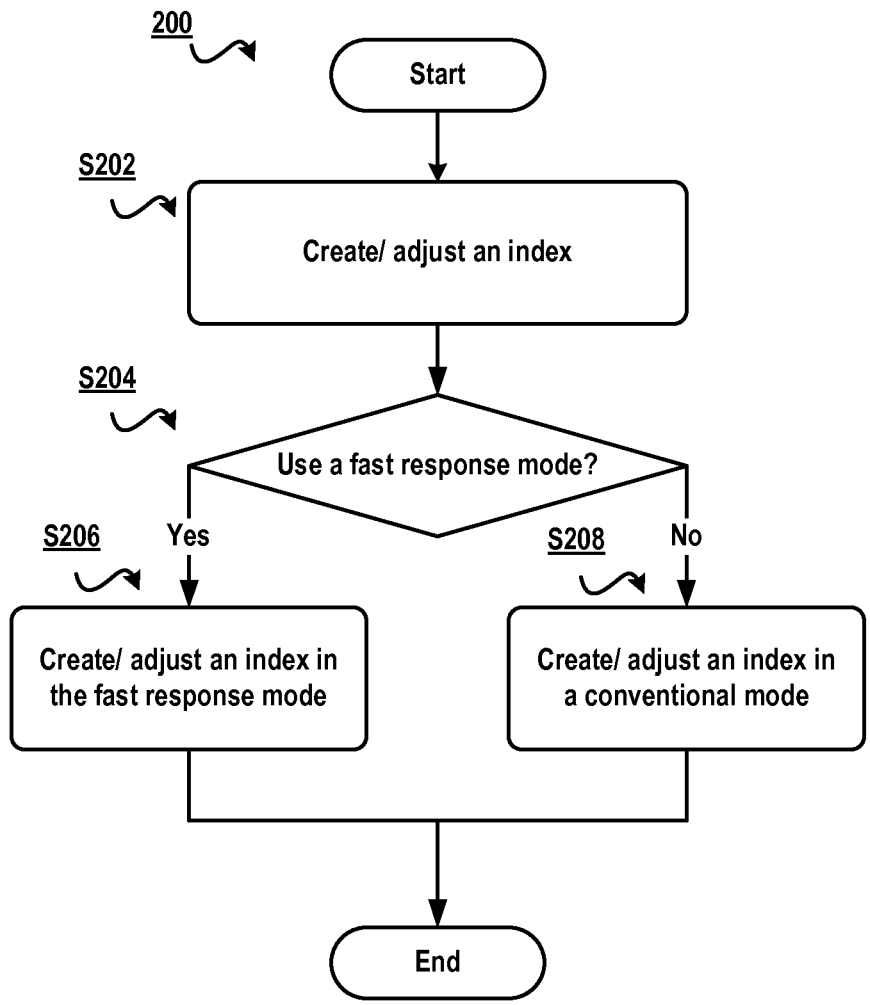
FIG. 2 illustrates a flowchart of a method of creating/adjusting an index according to one embodiment of the present invention.

(2) Adjusting the fast response mode into the conventional mode:
ALTER INDEX idx_name . . . disable_fast_response . . . ;
(3) Adjusting the index in conventional mode into the fast response mode:
ALTER INDEX idx_name . . . enable_fast_response with n . . . ;

FIG. 2 illustrates a flowchart 200 of a method of creating and/or adjusting an index according to an embodiment. At block S202, the operation of creating/adjusting an index is initiated. At block S204, it is determined based on the keywords as defined above whether the operation of creating/adjusting an index is based on the fast response mode according to embodiments or based on the conventional mode. If the result of the determining in block S204 is "YES," then the operation proceeds to block S206 to create/adjust the index in the fast response mode. Otherwise, the operation proceeds to block S208 to create/adjust the index in the conventional mode.

FIG. 3 illustrates a diagram 300 of a data structure of a node in a service index according to one embodiment, which is a schematic data structure of a node in the service index. The data structure of the service index differs from that of the main index in that the node in the service index further maintains the type of operation (e.g., insertion or deletion) that is performed on the main index data. The node in the service index may also adopt other data structures, as long as it is able to reflect the change information regarding the data in the main index.

In one embodiment, a node in the at least one service index includes one or both of node information that relates to a node of the main index and the type of operation that is performed on the main index. As illustrated in FIG. 3, field 302 and field 304 as a whole represent the node information associated with the main index, which are illustrated as row ID 302 and value 304, respectively. The field 306 represents the type of operation that is performed on the main index (for example, "I" represents "Insertion," and D represents "Deletion").

For example, a node in the service index may be illustrated as (R0, V1, I). The meaning of this triple is to perform an "insert" operation on the main index, and the row ID of the associated node in the main index is R0, with a value of V1. For example, a node in the service index may be illustrated as (R2, V1, D). The meaning of this triple is to perform a "delete" operation on the main index, and the row ID of the associated node in the main index is R2, with a value of V1.

Figure 4:
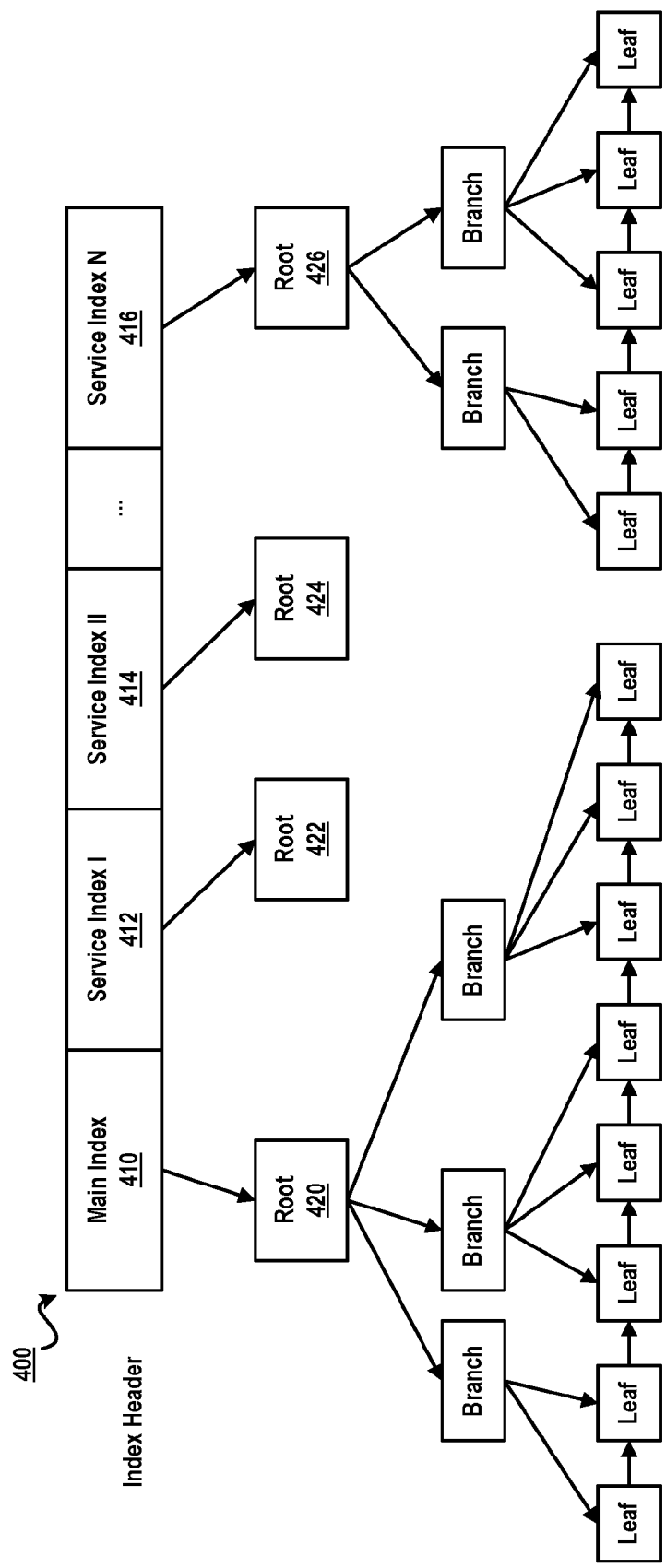
FIG. 4 illustrates a diagram of tree structures of a main service and a service index according to one embodiment of the present invention.

FIG. 4 illustrates a diagram 400 of tree structures of a main index and a service index according to one embodiment of the present invention. As illustrated in FIG. 4, in the fast response mode, the index header may include a main index 410 and may also include at least one service index (namely, service index I 412-service index N 416). The number and types of service indexes may be customized as required, which will be described hereinafter in detail.

It will be understood that a service index may employ a tree structure similar to that of the main index, while their difference lies in that the node content of the service index is different from that of the main index. Further, the main index is an index that exists for a long term and is updated at any time based on a DML operation performed on the database, while the service index merely records the change process data regarding the node data of the main index. With respect to the service indexes and main index, the corresponding node data may be saved in leaf nodes of FIG. 4. In other embodiments, it is not limited to the storage manner of saving the main index and at least one service index as illustrated in FIG. 4. Instead, various data structures may be employed to store the main index and the corresponding at least one service index, as long as the main index and the at least one service index may operate in coordination to accelerate the database response.

Over time, the change related to the node in the service index may also be gradually updated into the main index, and once the change related to the node in the service index has been updated into the main index, this node is deleted. In other words, after the information regarding each node in all service indexes has been updated into the main index, the service indexes may be empty (for example, as illustrated by the service index I 412, only one empty root node 422 exists under the field 412). Or for the sake of saving resources, these service indexes may be deleted. For example, the service index I 412 and root node 422 may be directly deleted. In this event, the service index II 414 directly follows the main index

410. When the subsequent data manipulation operation results in a need for updating the main index, at least one service index is further created correspondingly.

When performing an insert operation on the table in the database results in the need to perform an insert operation on the main index, a node marked as "I" type may be added in a service index (this node records node information associated with the node of the main index, for example, row ID and value). When performing a delete operation to a table in the database results in a need to perform a delete operation on the main index, a node marked as "D" type may be added in the service index. Although only insert (indicated as "I") and delete (indicated as "D") operations are illustrated, those skilled in the art will understand that a modify operation may be equivalent to a delete operation and an insert operation that are performed sequentially, and the operation type in the corresponding node may be recorded as "D" and "I," respectively. In other words, a delete node and an insert node may be added into the tree structure of a service node to indicate the modify operation.

In one embodiment, in response to performing a data manipulation operation, the main index and the at least one service index are updated in parallel, and in response to any one of the at least one service index and the main index having been successfully updated, it is indicated that the data manipulation operation ends.

Although the database index may accelerate the speed of the database in response to a data operation, when the size of a database index increases to a certain degree, the speed of updating the database index, which is caused by performing operations on the data in the database, may result in one or more bottlenecks that impact the response time of the database. The method according to the embodiments provides a database index function by creating at least one service index that records the process of data change regarding the node in the main index and taking the at least one service index and the main index as a whole.

In one embodiment, as long as any one of at least one service index and the main index has been successfully updated, it is indicated that the data manipulation operation is complete. This may reduce the time of updating the database index to a certain degree. Although perhaps the main index has not been completely updated yet, with the assistance of the at least one service index at this point, it is not necessary to wait for the main index to be completely updated so as to indicate the end of the data manipulation operation.

In one embodiment, updating the main index and at least one service index in parallel includes terminating the update for the at least one service index when the main index has been successfully updated first. In one embodiment, updating the main index and at least one service index in parallel includes terminating the update for other service indexes that have not been successfully updated yet when one of the at least one service index has been successfully updated first, continuing the update of the main index, and when the main index has been successfully updated, deleting nodes that have been previously successfully updated from service indexes that have been successfully updated.

Figure 5:
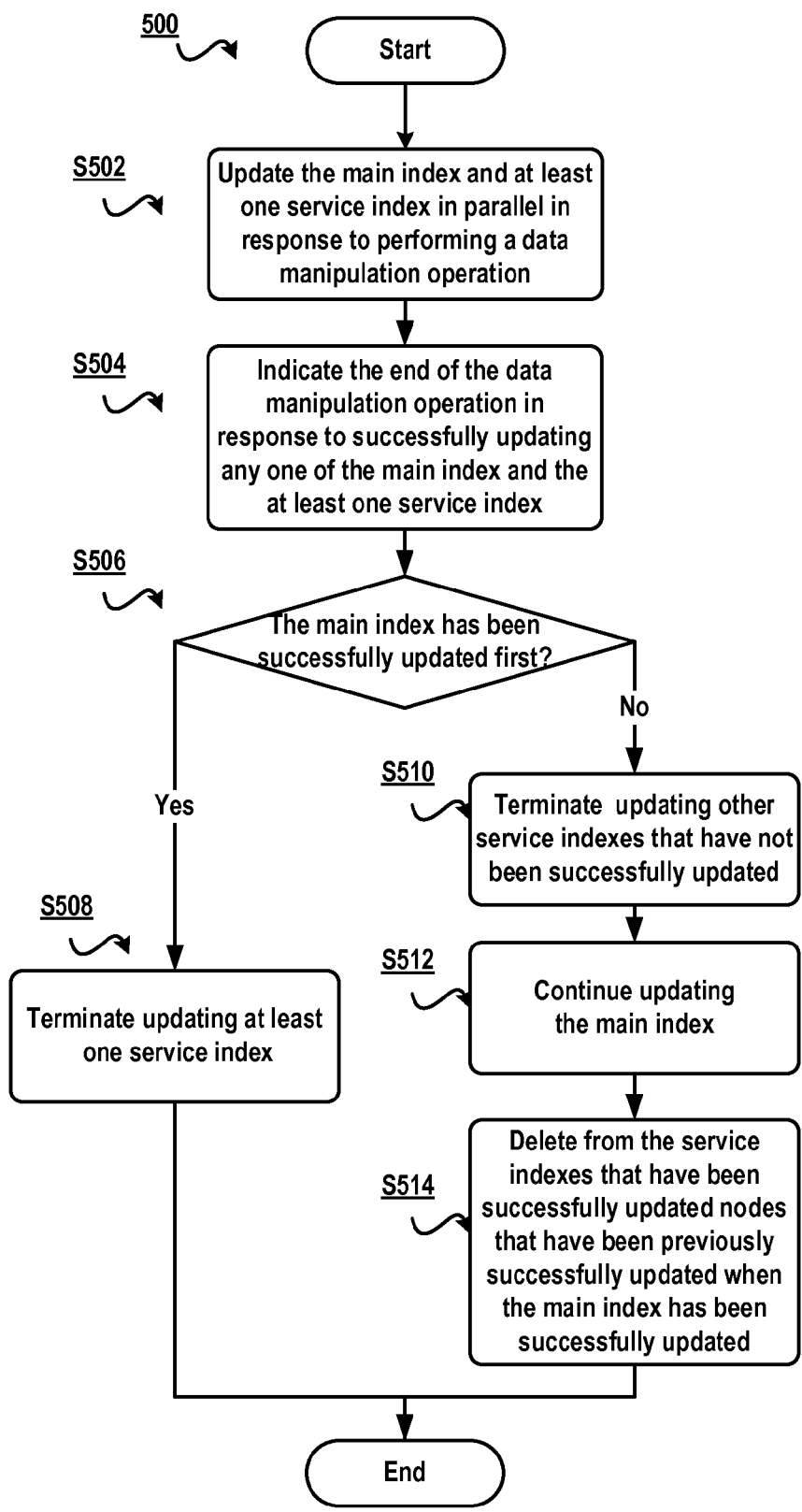
FIG. 5 illustrates a flowchart of a method of performing a data manipulation operation according to one embodiment of the present invention.

Hereinafter, the operation flow of updating the main index and at least one service index in parallel will be described in detail with reference to FIG. 5. FIG. 5 illustrates a flowchart of a method of performing a data manipulation operation according to one embodiment. At block S502, in response to performing a data manipulation operation, the main index and the at least one service index are updated in parallel. Here, "in parallel," when the data operation performed on the database (for example, inserting data into the table of the database, deleting data therefrom, and updating the data in the table of the database) results in the need to update the main index, a node is further inserted into the at least one service index when updating the main index, and this node records the change to the node to be updated in the main index. In the event that there exists a plurality of service indexes, a node is inserted into the plurality of service indexes in parallel.

At block S504, in response to any one of the at least one service index and the main index having been successfully updated, the data manipulation operation ends. Further, at block S506, it is determined whether the main index has been successfully updated first or not. The update here refers to any update performed on the main index. If the result of the determining is "YES," then the operation proceeds to block S508 to terminate the update the service index. Setting a service index to record a change to a node to be updated in the main index by using the at least one service index is implemented when it is determined that updating the main index would require a longer period of time. If the result of the determining at block S506 is "YES," it indicates that the update to the main index is faster than the update to all service indexes. In this event, no participation of service indexes is required, and the operation flow ends.

If the result of determining at block S506 is "NO," this indicates that one of the service indexes has been updated first, and the operation flow proceeds to block S510. The processes described in the right-side branch in FIG. 5 reflect that a node is needed in the at least one service index to record the change to the node to be updated in the main index. The precondition for proceeding to block S510 is that one of the at least one service indexes has been successfully updated first. Because the change to the node to be updated in the main index has been recorded in the first successfully updated service index, it is unnecessary to repetitively record this change in other service indexes. At block S510, other service indexes that have not been successfully updated yet are terminated.

At block S512, the main index continues to be updated, and at block S514, when the main index has been successfully updated, the node that has been previously successfully updated is deleted from the service indexes that have been successfully updated. Providing a service index enables the update to be recorded to the main index. Because the main index has been completely updated at block S514, it is unnecessary to further maintain the node related to the update in the service index, and thus the previously successfully updated node may be deleted from the successfully updated service index.

In one embodiment, a data manipulation operation is performed in, without limitation to, the sequence of FIG. 5. Instead, while announcing the end of the operation (block S504), it may be determined by another thread whether the main index or the service index has been updated first, and correspondingly, the operations such as blocks S508 to S514 are performed.

In another embodiment, a different mechanism may be employed to define the correspondence relationship between a node in the service index and an update to the main index. For example, when a service index has been successfully updated first, the thread that updates the service index may send a message to the thread that updates the main index and informs the identifier of the service index and the identifier (or location, etc.) of the updated node. When the main index has been successfully updated, then based on the identifier of the service index and the identifier (or location) of the node as informed, the corresponding node is deleted or marked as invalid. Those skilled in the art may contemplate other embodiments, as long as they can establish a correspondence relationship between the updated node in the main index and the updated node in the service index.

It will be understood that the number of nodes in each service index is dynamically varied. Performing a DML operation to a table in the database results in the need of updating the main index, so as to add a new node that records the corresponding update into the at least one service index. With the successful completion of continuously updating the main index as illustrated at block S514, the previously successfully updated node is deleted from the successfully updated service index. It will be understood that frequently performed DML operations on the table in the database may require frequent updates to the main index, which further causes an increase of the number of nodes in the at least one service index. By contrast, when operations performed need no updating of the main index for a continuous period of time, because the change associated with the node in the at least one service index has been updated into the main index, the number of nodes in the at least one service index will correspondingly decrease.

After a particular period of time, it is possible that one of the service indexes will be empty. It will be understood that although one of the service indexes is empty at this point, it does not mean that the method according to the embodiments is reduced to using a conventional index (corresponding to the main index). Instead, when it needs updating of the main index again, a new node may be further added into the service index according the above mentioned method. Embodiments of the present invention do not consider those database operations that do not involve operations on the main index (corresponding to the conventional index). Embodiments focus on how to manage the database index more efficiently, so as to further improve the response speed of the database operation by accelerating the response of the database index.

In one embodiment, when performing a data query operation, a query result is obtained by merging result sets of querying the main index and the at least one service index. In one embodiment, when performing a database query, the main index might not be completely updated yet. Thus, the main index itself cannot correctly reflect the actual content of each table in the database. In this instance, the result sets obtained by querying the main index and the at least one service index are merged to obtain the query result. At least one service index records the change to the node to be updated in the main index, and the current actual database content may be calculated based on these changes in the main index and service indexes.

Figure 6:
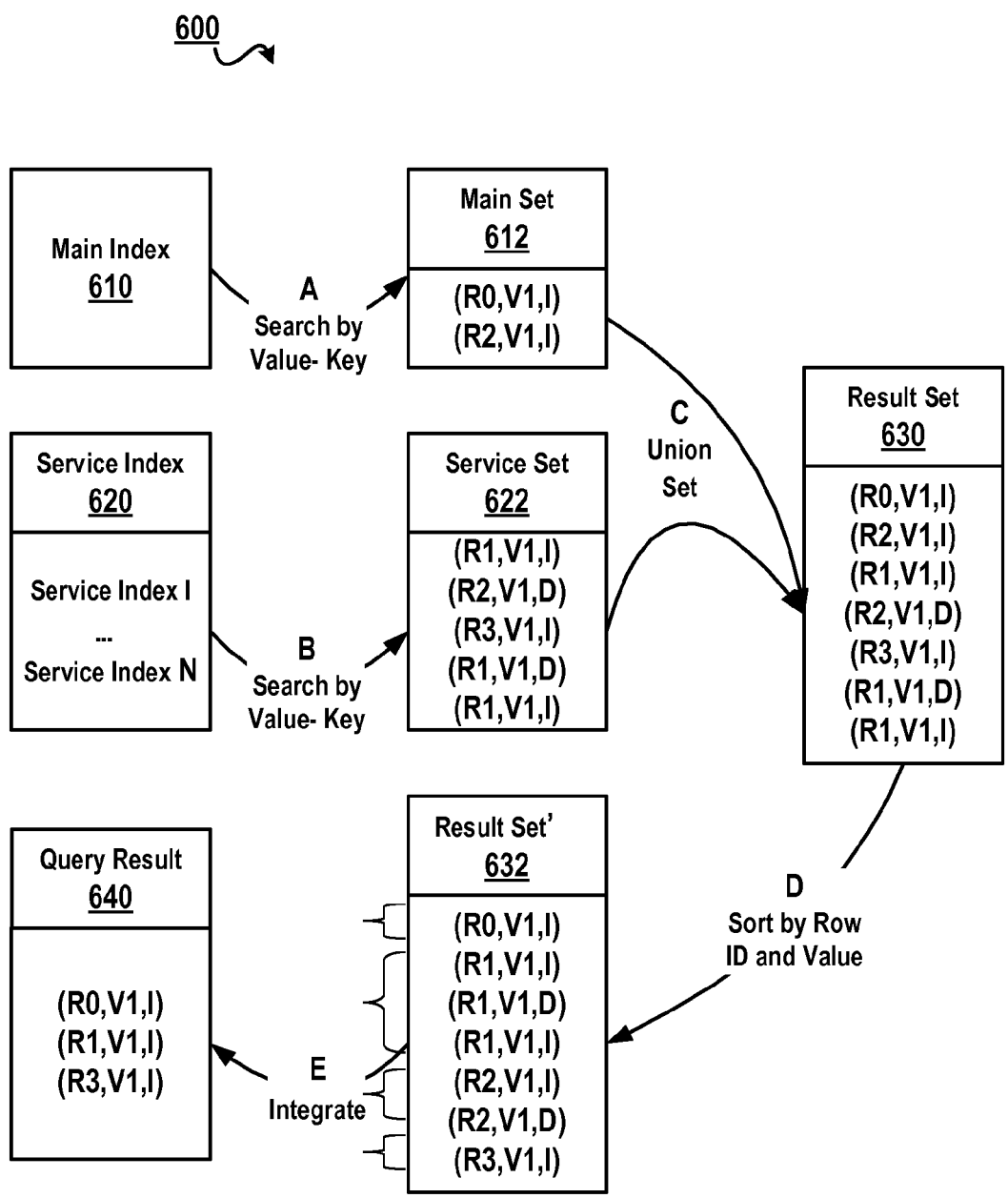
FIG. 6 illustrates a diagram of a process of obtaining a query result by merging results of querying a main index and a service index according to one embodiment of the present invention.

In one embodiment, obtaining a query result through merging result sets obtained by querying the main index and the at least one service index includes integrating nodes in the main index and the at least one service index that have identical node information into one node based on the type of operation. FIG. 6 illustrates a diagram 600 of a process of obtaining a query result by merging results of querying a main index and a service index according to one embodiment.

For example, as illustrated in the top left portion of FIG. 6, a main index 610 and a plurality of service indexes 620 (including service index I-service index N) have been created. During querying, the service index 610 and service indexes 620 may be retrieved by a value-key (as indicated by arrow A and arrow B). In the above specific example of a triple (row ID, value, operation types), a main set 612 and a service set 622 may be obtained, respectively. For example, the main set 612 is {(R0, V1, I), (R2, V1, I)}, while the service set 622 is {(R1, V1, I), (R2, V1, D), (R3, V1, I), (R1, V1, D), (R1, V1, I)}. It will be understood that that as previously mentioned, the "I" here indicates an insert operation, while "D" indicates a delete operation. After the union operation (as indicated by arrow C), the set of results 630 as obtained is {(R0, V1, I), (R2, V1, I), (R1, V1, I), (R2, V1, D), (R3, V1, I), (R1, V1, D), (R1, V1, I)}.

Because the change information within the service index at this point has not been updated into the main index yet, the node information in the service index needs to be merged on the basis of the main index to obtain the current data of the database. It will be understood that in various indexes, nodes that have identical information represent operations performed on the same data items in the table of the database. In this embodiment, the triples that have the identical row IDs and identical values correspond to operations on the same data items. For example, in the result set 630, the third triple (R1, V1, I) and the sixth triple (R1, V1, D) are both directed to the operation on the data item with a row ID R1 and a value V1. The difference lies in that the former is an insert operation, while the latter is a delete operation. These two operations may be merged.

Next, as indicated by arrow D, the result set 630 is sorted by row IDs and values, so as to merge nodes having identical row IDs and values, and the sorted result set' is indicated as 632. As illustrated in the result set' 632, the first triple is the operation on the first data item, and the second to fourth triples are operations on the second data item, and the fifth to sixth triples are operations on the third data item, and the last triple is the operation on the fourth data item. Finally, as indicated by arrow E, the merged final query result 640 reflects three triples, which correspond to three nodes {(R0, V1, I), (R1, V1, I), (R3, V1, I)}.

It will be understood that in the merging operation, for the same nodes, the "I" operation and "D" operation may be counteracted. For example, the operations as illustrated in the fifth to sixth triples as indicated in the result set' 632 may be counteracted.

It will be understood that the method according to the embodiments are likewise applicable when the service index 620 is empty, and in this instance, the main index 610 can correctly reflect the data in the database. When searching the service index 620, the returned service set 622 will also be empty, and the data in the union set (namely, the result set 630) of the main set 612 and the service set 622 is the result obtained by querying the main index 610. Accordingly, the method according to embodiments is also correct and valid at this point.

Based on the features of the data in various tables of the database and based on the operations of different types as performed on a table in the database, the indexes of various types may have different operation performances. In one embodiment, the at least one service index may be of one identical type or of different types. In one embodiment, any item in the at least one service index may be defined by different parameters to satisfy different operation demands. It will be understood that service indexes defined by different parameters may be of one identical type or of different types of service indexes.

For example, either a common index or a reverse index may be employed. For example, the reverse index is applicable to continuous data. For example, when non-discretely collectively inserting data such as 1, 2, 3, 4, . . . , the reverse index may be used. For another example, if the data inserted within a period of time are discrete, then a common index may be employed. If the data as produced are continuous and it is required to collectively insert continuous data within a period of time, then the reverse index may be used.

The service indexes may be defined by using different parameters, which may be determined by those skilled in the art according to circumstances and with reference to the definitions of various parameters involved in creating an index, which will not be detailed here.

Some embodiments of the method have been described above in detail with reference to FIG. 1 to FIG. 6. An apparatus for managing database indexes will now be described with reference to FIG. 7. FIG. 7 illustrates a block diagram 700 of an apparatus for managing database indexes using a service index according to one embodiment. In this embodiment, there is provided an apparatus for managing database indexes. The apparatus includes a first creating module 710 configured to create a main index, and a second creating module 720 configured to create at least one service index. The at least one service index records changes to a node to be updated in the main index. The apparatus also includes a detecting module 730 configured to detect whether an operation that involves the main index and is performed on the database appears in the database. The apparatus further includes an indexing module 740 configured to maintain the main index by using at least one service index, in response to an operation that involves the main index and is performed on the database appearing in the database. The maintaining is performed based on the changes to the node to be updated in the main index that are recorded in the at least one service node.

In one embodiment, a node in the at least one service index includes node information associated with the node of the main index and/or the type of operation that is performed on the main index.

In one embodiment, the indexing module 740 further includes a manipulating module 742 configured to maintain at least one of the main index and the service index during a data manipulation operation that is performed on the database. The indexing module 740 also includes a query module 744 configured to obtain a query result during a data query operation performed on the database.

In one embodiment, the manipulating module 742 further includes a module for updating the main index and at least one service index in parallel, in response to performing the data manipulation operation, and a module for indicating that the data manipulation operation ends, in response to any one of at least one service index and the main index having been successfully updated.

In one embodiment, the module for updating the main index and at least one service index in parallel includes a module for terminating the updating of the at least one service index when the main index has been successfully updated first.

In one embodiment, the module for updating the main index and at least one service index in parallel includes a module which, after one of the at least one service index has been successfully updated first, terminates the updating of other service indexes that have not been successfully updated, continues the updating of the main index and, when the main index has been successfully updated, deletes nodes that have been previously successfully updated from service indexes that have been successfully updated.

In one embodiment, the query module 744 further includes a module for obtaining a query result by merging result sets that are obtained by querying the main index and the at least one service index when the data query operation is performed.

In one embodiment, the module for obtaining a query result by merging result sets that are obtained by querying the main index and the at least one service index includes a module for integrating, in the main index and at least one service index, nodes that have identical node information into one node based on a type of operation.

In one embodiment, the at least one service index may be of identical type or of different types.

It will be understood that the method and apparatus according to various embodiments are particularly suitable for the scenarios where a large-scale index exists in a database and frequent operations on the database results in the need of frequently updating the large-scale index. By using a conventional index, only after the index has been completely updated, will the end of a DML operation on the database be indicated, which can result in time wasted, as well as computing resources wasted. Further, by using the method and apparatus according to various embodiments, a method of managing database indexes in fast response is provided in a manner that creates a plurality of service indexes. This method may improve the efficiency of data operation on the database by improving the working efficiency of updating the database index.

The embodiments may adopt a form of hardware embodiment, software embodiment (e.g., firmware, resident software, micro-code, etc.) or an embodiment comprising hardware components and software components.

Moreover, the embodiments may be implemented as a computer program product usable from computers or accessible by computer-readable media that provide program code for use by or in connection with a computer or any instruction executing system. For the purpose of description, a computer-usable or computer-readable medium may be any tangible module that can contain, store, communicate, propagate, or transport the program for use by or in connection with an instruction execution system, apparatus, or device.

The medium may be an electric, magnetic, optical, electromagnetic, infrared, or semiconductor system (apparatus or device), or propagation medium. Examples of the computer-readable medium would include the following: a semiconductor or solid storage device, a magnetic tape, a portable computer diskette, a random access memory (RAM), a read-only memory (ROM), a hard disk, and an optical disk. Examples of the current optical disk include a compact disk read-only memory (CD-ROM), compact disk-read/write (CR-ROM), and DVD.

A data processing system adapted for storing or executing program code would include at least one processor that is coupled to a memory element directly or via a system bus. The memory element may include a local memory usable during actually executing the program code, a mass memory, and a cache that provides temporary storage for at least one portion of program code so as to decrease the number of times for retrieving code from the mass memory during execution.

An Input/Output or I/O device (including, without limitation to, a keyboard, a display, a pointing device, etc.) may be coupled to the system directly or via an intermediate I/O controller.

A network adapter may also be coupled to the system such that the data processing system can be coupled to other data processing systems, remote printers or storage devices via an intermediate private or public network. A modem, a cable modem, and an Ethernet card are merely examples of a currently usable network adapter.

It is to be understood from the foregoing description that modifications and alterations may be made to the respective embodiments of the present invention without departing from the true spirit of the present invention. The description in the present specification is intended to be illustrative and not limiting.

What is claimed is:

1. A method of managing database indexes, comprising:
creating a main index for a database, wherein the main index is used for storing records of the database;
creating, by a computer, at least one service index configured for recording changes to be made to a node in the main index, wherein the service index includes a service node that comprises node information that is associated with the node of the main index and a type of operation that is performed on the node of the main index, wherein the type of operation includes one of a data manipulation operation, an insert operation or a delete operation;
detecting whether an operation that involves the main index and is performed on the database appears in the database;
maintaining the main index by using the at least one service index, in response to detecting the operation that involves the main index and is performed on the database appearing in the database, the maintaining performed based on changes to the node in the main index that are recorded in the service node of the service index;
responsive to performing a data query operation, obtaining a query result by merging result sets by integrating nodes from the service index and the main index that have identical node information into one node based on the type of operation, the result sets obtained by querying the main index and the at least one service index;
updating the main index and the at least one service index in parallel, in response to performing the data manipulation operation by:
terminating updating other service indexes that have not been successfully updated after one of the at least one service index has been successfully updated first;
continuing updating the main index; and
deleting nodes that have been previously successfully updated from service indexes that have been successfully updated when the main index has been successfully updated.

2. The method according to claim 1, further comprising:
indicating that the data manipulation operation ends, in response to any one of the at least one service index and the main index having been successfully updated.

3. The method according to claim 2, wherein the updating the main index and the at least one service index in parallel comprises:
terminating the updating of the at least one service index after the main index has been successfully updated first.

4. An apparatus for managing database indexes, comprising:
a first creating module configured to create a main index for a database, wherein the main index is used for storing records of the database;
a second creating module configured to create at least one service index, the at least one service index comprising a service node for recording changes to be made to a node in the main index, wherein the service node in the at least one service index comprises node information that is associated with the node of the main index and a type of operation that is performed on the node of the main index, wherein the type of operation includes one of a data manipulation operation, an insert operation or a delete operation;
a detecting module configured to detect whether an operation that involves the main index and is performed on the database appears in the database;
an indexing module configured to maintain the main index by using the at least one service index, in response to detecting the operation that involves the main index and is performed on the database appearing in the database, the maintaining performed based on changes to the node in the main index that are recorded in the service node of the service index;
a manipulating module configured to update the main index and the at least one service index in parallel, in response to performing the data manipulation operation by:
terminating updating other service indexes that have not been successfully updated after one of the at least one service index has been successfully updated first:
continuing updating the main index; and
deleting nodes that have been previously successfully updated from service indexes that have been successfully updated when the main index has been successfully updated, and
wherein the query module comprises a module configured to obtain a query result by merging result sets by integrating nodes from the service index and the main index that have identical node information into one node based on the type of operation, the result sets are obtained by querying the main index and the at least one service index when the data query operation is performed.

5. The apparatus according to claim 4, wherein the indexing module comprises
a query module configured to obtain a query result in a data query operation that is performed on the database.

6. The apparatus according to claim 5, wherein the manipulating module
is further configured to indicate that the data manipulation operation ends, in response to any one of the at least one service index and the main index having been successfully updated.

7. The apparatus according to claim 6, wherein the module configured to update the main index and the at least one service index in parallel comprises:
a module configured to terminate the updating of the at least one service index after the main index has been successfully updated first.

8. A computer program product for managing database indexes, the computer program product for managing database indexes, the computer program product comprising a computer readable storage medium having computer readable program code embodied therewith, which when executed by a computer cause the computer to implement a method, the method comprising:
creating a main index for a database, wherein the main index is used for storing records of the database;
creating at least one service index comprising a service node configured for recording changes to be made to a node in the main index, wherein the service node comprises node information that is associated with the node of the main index and a type of operation that is performed on the node in the main index, wherein the type of operation includes one of a data manipulation operation, an insert operation or a delete operation;
detecting whether an operation that involves the main index and is performed on the database appears in the database;
maintaining the main index by using the at least one service index, in response to detecting the operation that involves the main index and is performed on the database appearing in the database, the maintaining performed based on changes to a node to be updated in the main index that are recorded in the service node of the service index, responsive to performing a data query operation, obtaining a query result by merging result sets by integrating nodes from the service index and the main index that have identical node information into one node based on the type of operation, the result sets obtained by querying the main index and the at least one service index;

updating the main index and the at least one service index in parallel, in response to performing the data manipulation operation by:

terminating updating other service indexes that have not been successfully updated after one of the at least one service index has been successfully updated first;

continuing updating the main index; and deleting nodes that have been previously successfully updated from service indexes that have been successfully updated when the main index has been successfully updated.

9. The computer program product according to claim 8, wherein the computer readable program code further causes the computer to implement indicating that the data manipulation operation ends, in response to any one of the at least one service index and the main index having been successfully updated.

\* \* \* \* \*